United States Patent
Inagaki et al.

(10) Patent No.: US 8,247,101 B2
(45) Date of Patent: Aug. 21, 2012

(54) ACTIVE MATERIAL FOR BATTERY, NON-AQUEOUS ELECTROLYTE BATTERY AND BATTERY PACK

(75) Inventors: Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 489 days.

(21) Appl. No.: 12/408,826

(22) Filed: Mar. 23, 2009

(65) Prior Publication Data

US 2010/0015509 A1 Jan. 21, 2010

(30) Foreign Application Priority Data

Jul. 18, 2008 (JP) ................................. 2008-187193

(51) Int. Cl.
*H01M 2/10* (2006.01)
(52) U.S. Cl. ......................................................... 429/96
(58) Field of Classification Search .................. None
See application file for complete search history.

(56) References Cited

U.S. PATENT DOCUMENTS

| | | | | |
|---|---|---|---|---|
| 2004/0253510 A1* | 12/2004 | Jonghe et al. | ................... | 429/137 |
| 2006/0257746 A1* | 11/2006 | Inagaki et al. | ............... | 429/231.5 |
| 2007/0281212 A1* | 12/2007 | Thackeray et al. | ......... | 429/231.1 |
| 2008/0113264 A1 | 5/2008 | Inagaki et al. | | |
| 2009/0042095 A1 | 2/2009 | Inagaki et al. | | |
| 2009/0053605 A1 | 2/2009 | Harada et al. | | |

FOREIGN PATENT DOCUMENTS

| | | |
|---|---|---|
| JP | 8-22841 | 1/1996 |
| JP | 10-247496 | 9/1998 |
| JP | 2004-235144 | 8/2004 |
| JP | 2006-318797 | 11/2006 |
| JP | 2008-59980 | 3/2008 |

OTHER PUBLICATIONS

U.S. Appl. No. 12/512,540, filed Jul. 30, 2009, Inagaki, et al.
U.S. Appl. No. 12/818,566, filed Jun. 18, 2010, Inagaki, et al.
Japanese Office Action issued Feb. 28, 2012, in Japan Patent application No. 2008-187193 (with English Translation).
U.S. Appl. No. 13/181,211, filed Jul. 12, 2011, Inagaki, et al.

* cited by examiner

*Primary Examiner* — Emily Le
*Assistant Examiner* — Michael Forrest
(74) *Attorney, Agent, or Firm* — Oblon, Spivak, McClelland, Maier & Neustadt, L.L.P.

(57) ABSTRACT

A non-aqueous electrolyte battery includes a container, a positive electrode housed in the container, a negative electrode housed in the container with a space from the positive electrode and containing an active material, and a non-aqueous electrolyte housed in the container. The active material includes a lithium-titanium composite oxide particle and a coating layer formed on at least a part of the surface of the particle, the coating layer being contained at least one element selected from the group consisting of phosphorous and sulfur or a phosphorous compound or a sulfur compound.

15 Claims, 3 Drawing Sheets

US 8,247,101 B2

ACTIVE MATERIAL FOR BATTERY, NON-AQUEOUS ELECTROLYTE BATTERY AND BATTERY PACK

CROSS-REFERENCE TO RELATED APPLICATIONS

This application is based upon and claims the benefit of priority from prior Japanese Patent Application No. 2008-187193, filed Jul. 18, 2008, the entire contents of which are incorporated herein by reference.

BACKGROUND OF THE INVENTION

1. Field of the Invention

The present invention relates to an active material for a battery, a non-aqueous electrolyte battery and a battery pack.

2. Description of the Related Art

Non-aqueous electrolyte batteries which charge and discharge by transfer of lithium ions from the negative electrode to the positive electrode and vice versa are studied and developed enthusiastically.

These non-aqueous electrolyte batteries are desired to have various characteristics according to each use. They are most likely used, for example, in a about 3 C discharge operation for a power source of a digital camera and a about 10 C discharge operation for automobiles such as hybrid electric cars. For this reason, the non-aqueous electrolyte batteries for these uses are desired to have large-current characteristics in particular.

At present, non-aqueous electrolyte batteries using a lithium-transition metal composite oxide as the positive electrode active material and a carbonaceous material as the negative electrode active material are commercially available. In these lithium-transition metal composite oxides, Co, Mn and Ni are generally used as the transition metal.

In these days, much attention has been focused on a lithium-titanium composite oxide having a higher lithium absorption and releasing potential than a carbonaceous material (see, for example, JP-A 10-247496 (KOKAI)). The lithium-titanium composite oxide has the advantage that metal lithium does not precipitate at this lithium absorption and releasing potential in principle and is superior in rapid charging and low-temperature performance.

Among these lithium-titanium composite oxides, lithium titanate having a spinel structure as described in JP-A 8-22841 (KOKAI) attracts considerable attention because it has only small change in volume in a charge and discharge operation and also has high reversibility.

With regard to a non-aqueous electrolyte battery using a carbonaceous material as the negative electrode active material, the lithium absorption/releasing potential of the carbonaceous material is as low as about 0.1 V vs. $Li/Li^+$, and therefore, a stable coating film called SEI (solid electrolyte interface) is formed on a surface of the negative electrode, thereby limiting the decomposition of the non-aqueous electrolyte (for example, a non-aqueous electrolyte solution) on the surface of the negative electrode. On the other hand, the lithium absorption/releasing potential of the above lithium-titanium composite oxide is as high as about 1 to 2 V vs. $Li/Li^+$, and therefore, it is difficult to form a stable coating film on its surface, whereby the decomposition of the non-aqueous electrolyte solution proceeds continuously. Particularly, when a positive electrode provided with an active material containing Mn is combined with this negative electrode, Mn ions eluted from the Mn-containing active material act on the negative electrode and decompose the non-aqueous electrolyte solution significantly. As a result, gas is generated in the battery, which causes swelling of the battery.

BRIEF SUMMARY OF THE INVENTION

According to a first aspect of the present invention, there is provided an active material for a battery, comprising a lithium-titanium composite oxide particle and a coating layer formed on at least a part of the surface of the particle, the coating layer being contained at least one element selected from the group consisting of phosphorous and sulfur or a phosphorous compound or a sulfur compound.

According to a second aspect of the present invention, there is provided a non-aqueous electrolyte battery comprising: a container; a positive electrode housed in the container; a negative electrode housed in the container with a space from the positive electrode and containing an active material; and a non-aqueous electrolyte housed in the container, wherein the active material comprises a lithium-titanium composite oxide particle and a coating layer formed on at least a part of the surface of the particle, the coating layer being contained at least one element selected from the group consisting of phosphorous and sulfur or a phosphorous compound or a sulfur compound.

According to a third aspect of the present invention, there is provided a battery pack comprising a plurality of the non-aqueous electrolyte batteries, which are connected each other in series or in parallel or in series and parallel.

DETAILED DESCRIPTION OF THE INVENTION

Figure 1:
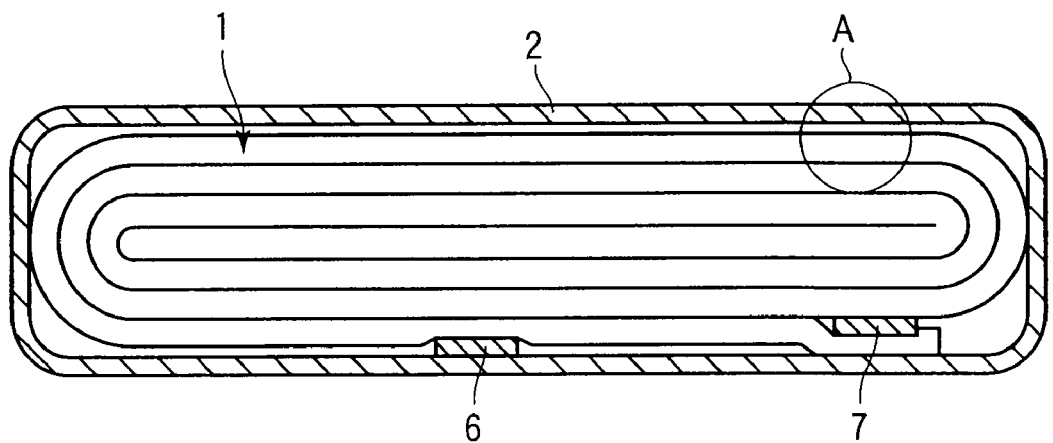
FIG. 1 is a cross-sectional view schematically illustrating a flat type non-aqueous electrolytic battery according to an embodiment.

An active material for a battery, a non-aqueous electrolyte battery and a battery pack according to an embodiment of the present invention will be explained in detail.

The active material for a battery according to this embodiment comprises a lithium-titanium composite oxide particle and a coating layer formed on at least a part of the surface of the particle. The coating layer is contained at least one element selected from the group consisting of phosphorous and sulfur or a phosphorous compound or a sulfur compound.

A lithium-titanium composite oxide absorbs lithium at a potential higher than 1 V (vs.$Li/Li^+$). In the case of an active material (for example, graphite and a lithium metal) which absorbs lithium at a potential lower than 1 V (vs.$Li/Li^+$), a thick coating film is formed on its surface by the decomposition of a non-aqueous electrolyte (for example, a non-aqueous electrolyte solution) in the initial charge operation. The formation of the coating film afterward suppresses the decomposition of the non-aqueous electrolyte solution. In the case of a lithium-titanium composite oxide which absorbs lithium at a potential higher than 1 V (vs.$Li/Li^+$), on the other hand, the decomposition reaction of the non-aqueous electrolyte solution is so small that a stable coating film is scarcely formed. Subsequently, the non-aqueous electrolyte solution is subjected to a decomposition reaction. Such a phenomenon conspicuously occurs in the case of active materials, for example, $Li_4Ti_5O_{12}$ having a spinel structure, $Li_2Ti_3O_7$ having a ramsdellite structure, $TiO_2$ having an anatase structure and $TiO_2$ having a rutile structure, which absorb lithium at a potential higher than 1 V (vs.Li/Li$^+$).

Since the active material for a battery according to the embodiment comprises a lithium-titanium composite oxide particle and a coating layer formed on at least a part of the surface of the particle, the coating layer being contained at least one element selected from the group consisting of phosphorous and sulfur or a phosphorous compound or a sulfur compound, the non-aqueous electrolyte solution is restrained from decomposition on the surface of the lithium-titanium composite oxide particle. As a result, gas generation associated with the decomposition of the non-aqueous electrolyte solution can be suppressed. Particularly, in the case of a structure in which a coating layer containing both phosphorous or a phosphorous compound and sulfur or a sulfur compound is formed on at least a part of the surface of the lithium-titanium composite oxide particle, the non-aqueous electrolyte solution can produce the effect of suppressing the decomposition of the non-aqueous electrolyte solution more efficiently.

This effect is significantly produced particularly when the active material for a battery is used as the negative electrode active material and an active material containing Mn such as a lithium-manganese composite oxide is used as the positive electrode active material. Specifically, it is known that when the positive electrode active material containing Mn is used, Mn is eluted in an electrolyte solution. The eluted Mn ions act on the negative electrode to promote the generation of gas. However, if the negative electrode active material according to this embodiment is used, the influence of these Mn ions can be alleviated.

The phosphorous compound used for the coating layer is preferably, for example, $Li_3PO_4$, $TiP_x$ ($0<x\leq2$) or $Li_yTiPO_4$ ($0\leq y\leq2$).

The sulfur compound used for the coating layer is preferably, for example, $Li_2SO_4$, or $Li_zTiS_2$ ($0<z\leq2$).

The above description "a coating layer formed on at least a part of the surface of the lithium-titanium composite oxide particle" means that a coating layer is formed on the entire or a part of the surface of the particle. When a coating layer formed on at least a part of the surface of the lithium-titanium composite oxide particle, the area of the coating layer to be formed is preferably 30% or more and more preferably 50% or more of the surface of the lithium-titanium composite oxide particle.

It is preferable that a coating layer containing both phosphorous or a phosphorous compound and sulfur or a sulfur compound has a multi-layers structure. In such a structure, it is preferable that a first coating layer containing the phosphorous or the phosphorous compound forms on the surface of the above particle and a second coating layer containing the sulfur or the sulfur compound forms on at least a part of the first coating layer. The above sulfur in the second coating layer is preferably a sulfur compound represented by the formula, $Li_2SO_4$ or $Li_zTiS_2$ ($0<z\leq2$).

It is preferable that the coating layer has the thickness of 1 to 100 nm. The term "thickness" so-called here means the average thickness. The thickness of the coating layer can be measured at plural positions by a time of flight secondary ion mass spectroscopy (TOF-SIMS), which will be explained later, to calculate the average of these measured thicknesses. Particularly, when the coating layer forms on the entire surface of the lithium-titanium composite oxide particle, a thickness of the coating layer is preferably defined in the above range (1 to 100 nm). A thickness of the coating layer falling in the above range can keep the same lithium ion absorption and releasing ability as lithium-titanium composite oxide particle which has not a coating layer. Therefore, this lithium-titanium composite oxide particle can attain a high energy density and large-current characteristics. Also, when the coating layer has a thickness in the range of 1 to 100 nm, the decomposition of the non-aqueous electrolyte solution which occurs on the surface of the active material can be suppressed efficiently. If the thickness of the coating layer is less than 1 nm, it is difficult to produce the effect of limiting the generation of gas sufficiently. If the thickness of the coating layer exceeds 100 nm, there is a fear that the coating layer itself constitutes a resistant component, which deteriorates the large-current characteristics of the battery. The thickness of the coating layer is more preferably 5 to 30 nm.

In order to form the coating layer containing the element or the compound on the surface of the lithium-titanium composite oxide particle, for example, a dry coating method such as a CVD method or sputtering method, a wet coating method such as a sol gel method or electroless plating, or a mixing/milling combined method such as a ball mill method or jet mill method may be adopted.

In order to uniformly form the coating layer containing a phosphorous compound such as $Li_3PO_4$ on the surface of the lithium-titanium composite oxide particle, the following method may be adopted. After the lithium-titanium composite oxide particles are added in a solution of $Li_3PO_4$ or $H_3PO_4$, followed by stirring and drying, the obtained particles are baked at 200 to 800° C. for several minutes to several hours. As the solvent used in the above solution, any solvent may be used insofar as it dissolves the solute and, for example, water or ethanol may be used. This method ensures that, regardless of the shape of lithium-titanium composite oxide particles, a coating layer of the above element or compound can be formed with high uniformity on the surface of the lithium-titanium composite oxide particle. Also, the adhesiveness of the coating layer to the lithium-titanium composite oxide particle can be improved. For this reason, even if charge-discharge operations are repeated for a long period of time, the effect of the above coating layer can be stably kept. A coating layer containing $TiP_x$ ($0<x\leq2$) or $Li_yTiPO_4$ ($0\leq y\leq2$) may be formed on the surface of the lithium-titanium composite oxide particle using the same method except that the baking condition is changed. As to sulfur, a sulfated material such as $Li_2SO_4$ or $(NH_4)_2SO_4$, which contains sulfur as the solute, may be used. A coating layer of $Li_2SO_4$ or $Li_xTiS_2$ ($0\leq x\leq2$) may be formed by selecting appropriate baking conditions.

It can be confirmed by the following method whether or not a coating layer containing at least one of phosphorous (P) and sulfur (S) is formed on at least a part of the surface of the lithium-titanium composite oxide particle. As one of these methods, a method is exemplified in which the concentrations of phosphorous (P) and sulfur (S) in the coating layer formed on the surface are measured in the line analysis or plane analysis of scanning electron microscopy-energy dispersion X-ray spectrometry (SEM-EDS). Also, the presence of phosphorous or sulfur in the coating layer may be likewise confirmed by X-ray photoelectron spectroscopy (XPS). After lithium-titanium composite oxide particle in which the coating layer containing the element or the phosphorous compound or the sulfur compound is formed on its surface is embedded in a resin and then cut to expose its section, the distribution of the element in the coating layer in the section can be confirmed by TOF-SIMS. Compounds in the coating layer formed on the surface of lithium-titanium composite oxide particle may be identified by measurement of X-ray diffraction (XRD) or TOF-SIMS. For the identification of the thickness and materials of the coating layer, a combination of XPS and TOF-SIMS is preferably used.

The thickness of the coating layer may be measured by the following method using TOF-SIMS.

First, lithium-titanium composite oxide particle in which the coating layer containing the element or the phosphorous compound or the sulfur compound is formed on its surface is embedded in a resin, and then the resin contained the particle being subjected to sectional processing using an argon ion milling device. Thereafter, the thickness of the coating layer is measured by TOF-SIMS. Here, the measurement by TOF-SIMS is made using TFS-2000 (trade name, manufactured by Physical Electronics). As the measuring condition, the following conditions may be selected: secondary ion polarity: positive, weight range (m/z): 0 to 1500 u, luster size: 60 $\mu m^2$, measuring time: 3 minutes, after-acceleration: 5 kV, measuring degree of vacuum: $4 \times 10^{-7}$ Pa, primary ion species: $^{69}Ga^+$, primary ion energy: 15 kV, sample potential: +3.2 kV, pulse width: 12 ns (1 ns after bunching), bunching: made, charge neutralization: none and time resolution ability: 138 ps/ch.

As the lithium-titanium composite oxide, a titanium type oxide such as $TiO_2$, a lithium-titanium oxide having, for example, a spinel structure or ramsdellite structure or a lithium-titanium composite oxide obtained by substituting a hetero element for a part of its structural element may be used. As the lithium-titanium oxide having a spinel structure, $Li_{4+x}Ti_5O_{12}$ ($0 \leq x \leq 3$) or a compound obtained by substituting a part thereof with a heteroatom may be used. As the lithium-titanium composite oxide having a ramsdellite structure, $Li_{2+y}Ti_3O_7$ ($0 \leq y \leq 3$) or a compound obtained by substituting a part thereof with a heteroatom may be used. As the titanium type oxide, a titanium-containing metal composite oxide containing Ti and at least one element selected from the group consisting of P, V, Sn, Cu, Ni, Fe and Co (for example, $TiO_2$—$P_2O_5$, $TiO_2$—$V_2O_5$, $TiO_2$—$P_2O_5$—$SnO_2$ or $TiO_2$—$P_2O_5$-MeO (Me is at least one element selected from the group consisting of Cu, Ni, Fe and Co) besides $TiO_2$ may be used.

The titanium-containing metal composite oxide preferably has a microstructure in which a crystal phase and an amorphous phase coexist or an amorphous phase singly exists. A titanium-containing metal composite oxide having such a microstructure enables a substantially high capacity to be drawn even in a high-rate charge-discharge operation and can also be improved in cycle performance.

The lithium-titanium composite oxide is preferably a lithium titanate having a spinel structure from the viewpoint of cycle life. Among these lithium titanates, $Li_{4+x}Ti_5O_{12}$ ($0 \leq x \leq 3$) having a spinel structure is particularly superior in initial charge-discharge efficiency and has a high effect on an improvement in cycle characteristics.

The molar ratio of oxygen in the lithium-titanium composite oxide is shown formally as 12 in the case of $Li_{4+x}Ti_5O_{12}$ ($0 \leq x \leq 3$) having a spinel structure and as 7 in the case of $Li_{2+y}Ti_3O_7$ ($0 \leq y \leq 3$). These molar ratios may be varied by the influence of oxygen non-stoichiometry.

The lithium-titanium composite oxide particle preferably has the following characteristics: an average particle diameter of, 1 $\mu m$ or less, and more preferably 0.8 to 1 $\mu m$, and a specific surface area, which is measured by the BET method using $N_2$ adsorption, of 5 to 50 $m^2/g$. Lithium-titanium composite oxide particle having such an average particle diameter and specific surface area can be improved in utilization and enables a substantially high capacity to be drawn even in a high charge-discharge operation. Here, the BET specific surface area by $N_2$ gas adsorption may be measured by using a Micromeritex ASAP-2010, manufactured by Shimadzu Corporation, with $N_2$ as the adsorbing gas.

The active material for a battery according to the embodiment may be used not only for a negative electrode but also for a positive electrode. The active material for a battery can efficiently restrain the decomposition of a non-aqueous electrolyte (for example, a non-aqueous electrolyte solution) which occurs on the surface of a lithium composite oxide, which is the active material, whichever electrode it is applied to. In other words, the effect of limiting the decomposition of the non-aqueous electrolyte solution is due to the lithium working potential (1 to 2 V vs. $Li/Li^+$) of the lithium-titanium composite oxide, and therefore, the effect on both electrodes is the same. Therefore, the active material for a battery according to this embodiment may be used for both the positive electrode and the negative electrode and the same effect can be obtained.

When the active material for a battery according to this embodiment is used for the positive electrode, metal lithium, a lithium alloy or a carbon type material such as graphite and coke may be used for an active material of the negative electrode, which is the counter electrode.

Next, the non-aqueous electrolyte battery according to this embodiment will be explained in detail.

The non-aqueous electrolyte battery is provided with a container. The positive electrode is housed in the container. The negative electrode is housed in the container with a space from the positive electrode, for example, with a separator being interposed between these electrodes. The negative electrode contains, as the negative electrode active material, the aforementioned active material for a battery comprising the lithium-titanium composite oxide particle and the coating layer formed on at least a part of the surface of the composite oxide particle and containing at least one element selected from the group consisting of phosphorous and sulfur or a compound of the element. The non-aqueous electrolyte is housed in the container.

The container, negative electrode, non-aqueous electrolyte, positive electrode and separator will be described in detail.

1) Container Material

As the container, a container made of a laminate film 0.5 mm or less in thickness or a metal 1.0 mm or less in thickness is used. The thickness of the metal container is more preferably 0.5 mm or less.

Examples of the form of the container include a flat form (thin type), angular form, cylindrical form, coin form and button form. Examples of the container are containers for small-sized batteries to be mounted on, for example, mobile electronic devices and containers for large-sized batteries to be mounted on two-wheel vehicles or four-wheel vehicles according to the dimensions of the battery.

As the laminate film, a multilayer film prepared by interposing a metal layer between resin layers is used. The metal layer is preferably made of an aluminum foil or an aluminum alloy foil to develop a lightweight layer. Examples of the resin layer include polymer material such as polypropylene (PP), polyethylene (PE), nylon or polyethylene terephthalate (PET). A laminate film can be molded into the shape of the container by carrying out thermal fusion to seal the molded material.

The metal container is preferably made of aluminum or an aluminum alloy. As the aluminum alloy, alloys containing elements such as magnesium, zinc and silicon are preferable. When transition metals such as iron, steel, nickel and chromium are contained in the alloy, the amount of these transition metals is preferably made to be 100 ppm or less.

2) Negative Electrode

The negative electrode comprises a current collector and a negative electrode layer formed on one or both surfaces of the current collector and containing an active material, a conductive agent and a binder.

As the active material, the above active material for a battery comprising the lithium-titanium composite oxide particle and a coating layer formed on at least a part of the surface of the composite oxide particle, the coating layer being contained at least one element selected from the group consisting of phosphorous and sulfur or a phosphorous compound or a sulfur compound is used.

As the conductive agent, for example, a carbon material may be used. Examples of the carbon material include acetylene black, carbon black, coke, carbon fibers or graphite. As other conductive agents, a metal powder such as an aluminum powder or conductive ceramics such as TiO may be used. Among these materials, coke and graphite which are heat-treated at 800 to 2000° C. and have an average particle diameter of 10 μm or less and carbon fibers having an average diameter of 1 μm or less are preferable. The BET specific surface area of the carbon material, which is measured by $N_2$ adsorption, is preferably 10 $m^2/g$ or more.

Examples of the binder include polytetrafluoroethylene (PTFE), polyvinylidene fluoride (PVdF), fluorine type rubber, styrene-butadiene rubber or a core-shell binder.

As to the proportions of the active material, conductive agent and binder, it is preferable that the amount of the active material is in the range of 70 to 96% by weight, the amount of the conductive agent is in the range of 2 to 28% by weight and the amount of the binder is in the range of 2 to 28% by weight. When the amount of the conductive agent is less than 2% by weight, the current-collecting performance of the negative electrode layer may deteriorate and the large-current characteristics of the non-aqueous electrolyte secondary battery may therefore be deteriorated. When the amount of the binder is less than 2% by weight, there is a fear as to deterioration in binding characteristics between the negative electrode layer and the current collector and hence deterioration in cycle characteristics. The amounts of the conductive agent and binder are respectively preferably 28% by weight or less from the viewpoint of increasing the capacity of the battery.

The porosity of the negative electrode layer is preferably 20 to 50% by volume. The negative comprising the negative electrode layer having such the porosity is highly densified and is superior in affinity to the non-aqueous electrolyte. The porosity is more preferably 25 to 40% by volume.

The current collector is preferably made of an aluminum foil or an aluminum alloy foil. The aluminum foil or the aluminum alloy foil preferably has an average crystal particle diameter of 50 μm or less. This can outstandingly improve the strength of the current collector and therefore, the negative electrode can be highly densified under high pressure, thus enabling the battery capacity to be increased. Also, because the dissolution and corrosive deterioration of the current collector in an overdischarge cycle under a high-temperature environment (40° C. or more) can be prevented, a rise in negative electrode impedance can be limited. Moreover, the battery can also be improved in output characteristics, rapid charging characteristics and charge-discharge cycle characteristics. The average crystal particle diameter is more preferably 30 μm or less and even more preferably 5 μm or less.

The average crystal particle diameter may be found in the following manner. The structure of the surface of the current collector made of the aluminum foil or the aluminum alloy foil is observed under an optical microscope to find the number n of crystal particles present in an area of 1 mm×1 mm. The average crystal particle area S is found using the obtained n from the equation $S=1\times10^6/n$ (μm$^2$). From the obtained value of S, the average crystal particle diameter d (μm) is calculated according to the following equation (1):

$$d=2(S/\pi)^{1/2} \quad (1)$$

An aluminum foil or an aluminum alloy foil of which the above average crystal particle diameter is 50 μm or less is complexly affected by plural factors such as material organization, impurities, processing conditions, heat treating hysteresis and annealing conditions and the above crystal particle diameter is adjusted by the appropriate combination of the above factors in the production process.

The thickness of the aluminum foil or the aluminum alloy foil is preferably 20 μm or less and more preferably 15 μm or less. The purity of the aluminum foil is preferably 99% by weight or more. As the aluminum alloy, alloys containing an element such as magnesium, zinc and silicon are preferable. On the other hand, it is preferable that transition metals such as iron, copper, nickel and chromium be contained in the aluminum alloy in an amount of 1% by weight or less.

In the manufacture of the negative electrode, the active material, the conductive agent and the binder are suspended in a suitable solvent to prepare a slurry. Then, the slurry is coated on the surface of a current collector and dried to form a negative electrode layer, which is then pressed to manufacture the negative electrode. Alternatively, a mixture consisting of the active material, the conductive agent and the binder may be formed into pellets for using them to form the negative electrode layer.

3) Non-Aqueous Electrolyte

Examples of the non-aqueous electrolyte are a liquid non-aqueous electrolyte which can be prepared by dissolving an electrolyte in an organic solvent, and a gel-like non-aqueous electrolyte which can be obtained by making a liquid electrolyte and a macromolecular material into a composite configuration.

The liquid non-aqueous electrolyte can be prepared by dissolving an electrolyte in an organic solvent at a concentration of not less than 0.5 mol/L and not more than 2.5 mol/L.

Examples of the electrolyte are lithium salts such as lithium perchlorate (LiClO$_4$), lithium phosphate hexafluoride (LiPF$_6$), lithium borate tetrafluoride (LiBF$_4$), lithium arsenate hexafluoride (LiAsF$_6$), lithium trifluorometasulfonate (LiCF$_3$SO$_3$), bistrifluoromethyl sulfonyliminolithium [LiN(CF$_3$SO$_2$)$_2$], and a mixture thereof. Among them, LiPF$_6$ is most preferable electrolyte, because it can be hardly oxidized even at high electrical potentials.

Examples of the organic solvent are cyclic carbonates such as propylene carbonate (PC), ethylene carbonate (EC) and vinylene carbonate; linear carbonates such as diethylene carbonate (DEC), dimethylene carbonate (DMC) and methylethyl carbonate (MEC); cyclic ethers such as tetrahydrofuran (THF), 2methyl tetrahydrofuran (2Me THF) and dioxorane (DOX); linear ethers such as dimethoxy ethane (DME) and diethoxy ethane (DEE); γ-butyrolactone (GBL); acetonitrile (AN); sulforane (SL). These solvents can be used singly or in combination of two or more.

Examples of the macromolecular materials are poly(vinylidene fluoride) (PVdF), polyacrylonitrile (PAN), polyethylene oxide (PEO), etc.

A preferable example of the organic solvent is a mixed solvent comprising at least two kinds of organic solvent selected from the group consisting of propylene carbonate (PC), ethylene carbonate (EC) and γ-butyrolactone (GBL). A more preferable organic solvent is γ-butyrolactone (GBL).

The negative electrode active material is capable of absorbing and desorbing lithium ion at an electrical potential zone in the vicinity of 1.5 V and 1.3 to 1.4 V (vs. Li/Li$^+$). However, the reducing decomposition of non-aqueous electrolyte is unlikely to take place in this electrical potential zone, so that it is difficult to deposit a film of the reduction product of non-aqueous electrolyte on the surface of lithium titanium composite oxide. Because of this, when the battery is preserved under a lithium-absorbed condition, i.e., a charged condition, the lithium ion that has been absorbed in the active material is permitted to gradually diffuse into the electrolyte, thereby permitting self-discharging to take place. This self-discharging would become more prominent as the storage environments of battery are brought into higher temperatures.

Among the aforementioned organic solvents, γ-butyrolactone can be more easily reduced as compared with linear carbonate or with cyclic carbonate. More specifically, when the easiness of reduction is compared among these organic solvents, it can be represented by the order of: γ-butyrolactone>>>ethylene carbonate>propylene carbonate>>dimethyl carbonate>methylethyl carbonate>diethyl carbonate. For this reason, when γ-butyrolactone is added to an electrolyte, it becomes possible to deposit a film of excellent quality on the surface of lithium titanium composite oxide. As a result, it is possible to suppress the self-discharging of battery and to enhance the high-temperature storage characteristics of non-aqueous electrolyte battery.

With respect to the mixed solvent comprising at least two organic solvent selected from the group consisting of propylene carbonate (PC), ethylene carbonate (EC) and γ-butyrolactone (GBL) as well as with respect to especially the mixed solvent containing γ-butyrolactone also, it is possible, in the same manner as described above, to suppress the self-discharging of battery and to enhance the high-temperature storage characteristics of non-aqueous electrolyte battery.

When the mixing ratio of the γ-butyrolactone in the organic solvent is not less than 40% by volume and not more than 95% by volume, it is possible to form a protective film of excellent quality on the surface of the negative electrode active material.

4) Positive Electrode

The positive electrode comprises a current collector, and a positive electrode layer which is formed on one or both surfaces of the current collector and contains an active material, a conductive agent and a binder.

The current collector can be fabricated, for example, from aluminum foil, or from aluminum alloy foil containing an element such as Mg, Ti, Zn, Mn, Fe, Cu, Si.

The active material can be used, for example, oxides or polymers.

Examples of the oxides are manganese dioxide ($MnO_2$) wherein lithium is absorbed therein, iron oxide, copper oxide, nickel oxide, lithium manganese composite oxides (for example, $Li_xMn_2O_4$ or $Li_xMnO_2$), lithium nickel composite oxides (for example, $Li_xNiO_2$), lithium cobalt composite oxides (for example, $Li_xCoO_2$), lithium nickel cobalt composite oxides (for example, $LiNi_{1-y}Co_yO_2$), lithium manganese cobalt composite oxides (for example, $Li_xMn_yCo_{1-y}O_2$), spinel type lithium manganese nickel composite oxides (for example, $Li_xMn_{2-y}Ni_yO_4$), lithium phosphorus oxide of olivine structure (for example, $Li_xFePO_4$, $Li_xFe_{1-y}Mn_yPO_4$, $Li_xCoPO_4$), iron sulfate ($Fe_2(SO_4)_3$), vanadium oxide (for example, $V_2O_5$). Herein x and y are preferably $0<x\leqq 1$ and $0<y\leqq 1$, respectively.

The polymers can be used, for example, conductive polymer materials such as polyaniline, polypyrrole; and disulfide-based polymer materials. The active material can be also used sulfur (S) or carbon fluoride.

Preferable examples of the active material are those exhibiting a high positive electrode voltage such as lithium manganese composite oxides ($Li_xMn_2O_4$), lithium nickel composite oxides ($Li_xNiO_2$), lithium cobalt composite oxides ($Li_xCoO_2$), lithium nickel cobalt composite oxides ($LiNi_{1-y}Co_yO_2$), spinel type lithium manganese nickel composite oxides ($Li_xMn_{2-y}Ni_yO_4$), lithium manganese cobalt composite oxides ($Li_xMn_yCo_{1-y}O_2$), and lithium iron phosphate ($Li_xFePO_4$). Herein x and y are preferably $0<x\leqq 1$ and $0<y\leqq 1$, respectively.

More preferable examples of the active material are lithium cobalt composite oxides and lithium manganese composite oxides. Since these composite oxides are high in ionic conductivity, the diffusion of lithium ion in the positive electrode active material can be hardly brought into a rate-determining step in the employment thereof in combination with the negative electrode active material of this embodiment. For this reason, these composite oxides are excellent in compatibility with lithium titanium composite oxide particle as the negative electrode active material of this embodiment.

In the non-aqueous electrolyte battery of the embodiment, the positive electrode containing the Mn-containing active material causing the elution of Mn is combined with the negative electrode containing the active material which comprises the lithium-titanium composite oxide particle and a coating layer formed on at least a part of the surface of the composite oxide particle and containing least one element selected from the group consisting of phosphorous and sulfur or a compound of the element, thereby obtaining a higher effect. When the positive electrode active material is, particularly, a manganese-containing lithium transition metal composite oxide having a spinel type structure, a further higher effect is obtained. The manganese-containing lithium transition metal composite oxide having a spinel type structure is for example, $Li_xMn_{2-y}M_yO_4$ ($0<x\leqq 1.2$, $0<y\leqq 1$, M is an element other than Mn). As the element M, for example, Co and Al may be used, and have the effect of reducing the amount of Mn eluted.

The primary particle diameter of the active material is preferably not less than 100 nm and not more than 1 μm in order to facilitate the handling of the active material in the industrial production and to enable the in-solid diffusion of lithium ion to proceed smoothly.

Preferably, the specific surface area of the active material (particle of the active material) may be in the range of not less than 0.1 m$^2$/g and not more than 10 m$^2$/g. When the specific surface area of positive electrode active material is confined to this range, it is possible to sufficiently secure the absorption/desorption site of lithium ion, to facilitate the handling thereof in the industrial production and to secure excellent charge/discharge cycle performance of battery.

Examples of the conductive agent include carbonaceous materials such as acetylene black, carbon black, graphite. Such the conductive agent is effective in enhancing the electronic collecting performance and in suppressing the contact resistance thereof to the current collector.

The binder which is used for bonding the active material with the conductive agent can be used, for example, polytetrafluoroethylene (PTFE), poly(vinylidene fluoride) (PVdF), fluorinated rubber.

The mixing ratio of the active material, the conductive agent and the binder is preferably 80 to 95% by weight of the active material, 3 to 18% by weight of the conductive agent, and 2 to 17% by weight of the binder. When the conductive agent is incorporated at 3% by weight or more, it becomes possible to enable the conductive agent to exhibit the aforementioned effects. When the mixing ratio of the conductive agent is confined to not more than 18% by weight, it is possible to minimize the decomposition of the non-aqueous electrolyte on the surface of conductive agent in the storage even under high temperatures. When the binder is incorporated at a mixing ratio of not less than 2 wt %, it is possible to secure a sufficient strength of the electrode. When the mixing ratio of binder is limited to not more than 17 wt %, it is possible to decrease the mixing ratio of an insulating component in the positive electrode active material-containing layer and to decrease the internal resistance of positive electrode.

In the manufacture of the positive electrode, the active material, the conductive agent and the binder are suspended in a suitable solvent to prepare a slurry. Then, the slurry is coated on the surface of a current collector and dried to form a positive electrode layer, which is then pressed to manufacture the positive electrode. Alternatively, a mixture consisting of the active material, the conductive agent and the binder may be formed into pellets for using them to form the positive electrode layer.

5) Separator

The separator is made of a porous film or nonwoven fabric made of a synthetic resin containing polyethylene, polypropylene, cellulose or polyvinylidene fluoride (PVdF). Of these materials, a porous film made of polyethylene or polypropylene melts at a fixed temperature to be able to cut off current and is therefore desirable from the viewpoint of improving safety.

Figure 2:
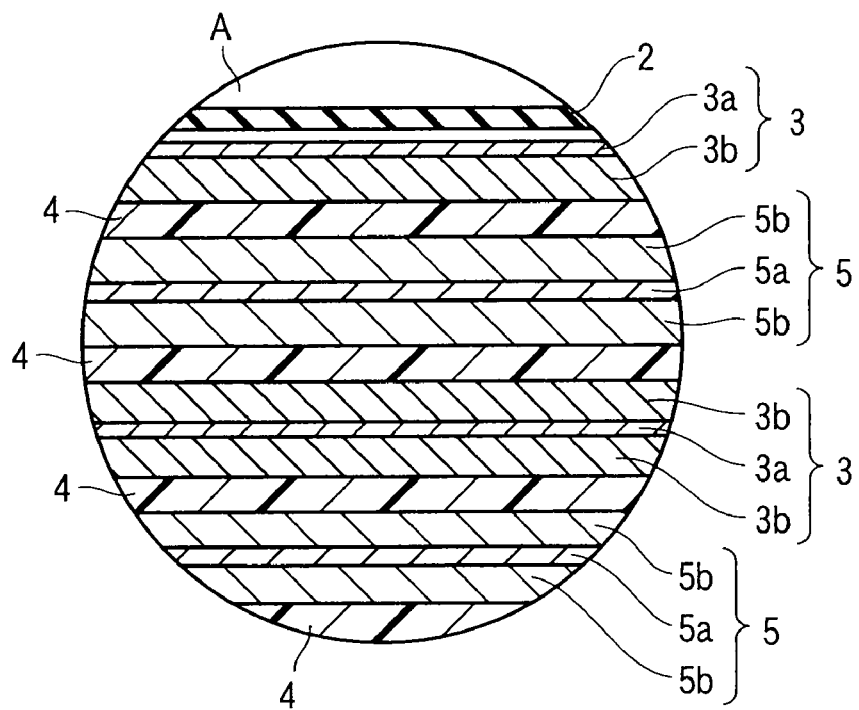
FIG. 2 is an enlarged cross-sectional view illustrating the portion "A" of FIG. 1.

Next, the non-aqueous electrolyte battery (a flat type non-aqueous electrolyte battery where the outer case of formed of a laminate film) according to one embodiment will be explained in detail with reference to FIGS. 1 and 2. FIG. 1 is a cross-sectional view schematically illustrating a thin type non-aqueous electrolyte battery; and FIG. 2 is an enlarged cross-sectional view illustrating the portion A of FIG. 1. By the way, each of FIGS. 1 and 2 depicts a schematic view for assisting the understanding of the present invention and the explanation thereof so that the configuration, dimension and dimensional ratio of some of the constituent components may differ from those of the actual apparatus. However, specific geometry of these components can be optionally modified with reference to the following descriptions and the conventional technology.

A flattened wound electrode group 1 is housed in a bag-like outer case 2 which is formed from a laminate film comprising a couple of resin films with a metal layer interposed between them. The flattened wound electrode group 1 is constructed by spirally wounding and press-molding a laminate comprising mentioning from outside, a negative electrode 3, a separator 4, a positive electrode 5 and a separator 4. As shown in FIG. 2, the negative electrode 3 constituting the outermost husk is constructed such that a negative electrode layer 3b containing an active material is laminated on an inner surface of a current collector 3a. The active material comprises a lithium-titanium composite oxide particle and a coating layer formed on at least a part of the surface of the particle, the coating layer being contained at least one element selected from the group consisting of phosphorous and sulfur or a phosphorous compound or a sulfur compound. Other negative electrodes 3 are respectively constructed such that the aforementioned negative electrode layers 3b are formed on the opposite surfaces of the current collector 3a. The positive electrode 5 is constructed such that a positive electrode layer 5b is formed on the opposite surfaces of a current collector 5a.

In the vicinity of the outer circumferential edge portion of the electrode group 1, a negative electrode terminal 6 is electrically connected to the current collector 3a of the negative electrode 3 constituting the outermost husk and a positive electrode terminal 7 is electrically connected to the current collector 5a of the inner positive electrode 5. These negative electrode terminal 6 and positive electrode terminal 7 are led out through an opening of the bag-like outer case 2. For example, a liquid non-aqueous electrolyte is poured into the bag-like outer case 2 through the opening of the outer case 2. The opening of the bag-like outer case 2 is heat-sealed with the negative electrode terminal 6 and positive electrode terminal 7 being positioned inside, thereby completely sealing the electrode group 1 and the liquid non-aqueous electrolyte.

The negative electrode terminal can be made of materials which are conductive and electrically stable under the condition where the electrical potential of metal lithium ion is not less than 1.0 V and not more than 3.0 V. Examples of the material for the negative electrode terminal are aluminum or aluminum alloy containing Mg, Ti, Zn, Mn, Fe, Cu, Si. Preferably, the negative electrode terminal should be formed of the same material as that of the current collector of negative electrode in order to minimize the contact resistance thereof to the current collector.

The positive electrode terminal can be made of materials which are electrically conductive and electrically stable under the condition where the electrical potential of metal lithium ion is not less than 3.0 V and not more than 4.25 V. Examples of the material for the positive electrode terminal are aluminum or aluminum alloys containing any of elements such as Mg, Ti, Zn, Mn, Fe, Cu, Si. Preferably, the positive electrode terminal should be formed of the same material as that of the current collector of positive electrode in order to minimize the contact resistance thereof to the current collector.

The non-aqueous electrolyte battery according to this embodiment ensures that it is provided with a negative electrode containing the active material comprising a lithium-titanium composite oxide particle and a coating layer formed on at least a part of the surface of the particle, the coating layer being contained at least one element selected from the group consisting of phosphorous and sulfur or a phosphorous compound or a sulfur compound, whereby the decomposition reaction of the non-aqueous electrolyte which arises on the surface of the lithium-titanium composite oxide particle can be efficiently limited. As a result, the generation of gas on the surface of the negative electrode can be suppressed, and a non-aqueous electrolyte battery reduced in the swelling of the container can be provided. Such an effect can be obtained more significantly when, particularly, this negative electrode is combined with the positive electrode containing the Mn-containing positive electrode active material.

Next, a battery pack according to an embodiment will be explained in detail.

The battery pack according to the embodiment comprises a plurality of the above non-aqueous electrolyte batteries (unit cells). These cells are so arranged that they are electrically connected each other in series or in parallel or in series and parallel.

The non-aqueous electrolyte battery according to this embodiment is preferably used as each of the unit cells forming a battery module. The obtained battery pack has excellent cycle characteristics.

That is, in the decomposition reaction of the non-aqueous electrolyte which arises on the surface of the negative electrode (lithium-titanium composite oxide as an active material), the reaction amount varies corresponding to the environmental temperature and increases with increase in environmental temperature as mentioned above. The battery module is constituted by combining plural unit cells. Therefore, the heat of a unit cell disposed at the outermost position tends to be easily radiated and therefore the temperature of the unit cell tends to drop. On the other hand, the heat of a unit cell disposed inside tends not to be radiated and therefore the temperature of the unit cell tends not to drop. In other words, the temperature in the battery module differs depending on the position and therefore, the temperatures of the unit cells tend to be different from each other. As a result, the amount of the non-aqueous electrolyte solution decomposed is larger in unit cells disposed inside than in unit cells disposed outside. The decomposition of the non-aqueous electrolyte solution on the surface of the negative electrode lowers the charge-discharge efficiency of the negative electrode, which destroys the balance in capacity between the positive electrode and the negative electrode. This adverse capacity balance causes a part of the battery to be put in an overcharge state, which shortens the cycle life of the battery module.

In the battery module obtained by combining a plurality of the non-aqueous electrolyte batteries according to the embodiment as the unit cells, any unit cell can be reduced in the amount of the non-aqueous electrolyte solution decomposed. For this reason, the battery is resistant to the influence of temperature unevenness, and thus the cycle life of the battery module can be made longer.

One example of such a battery pack will be explained in detail with reference to FIGS. 3 and 4. The single cell can be used the flat type battery as shown in FIG. 1.

A plurality of single cells 21, each formed of the flatting type non-aqueous electrolyte battery shown in FIG. 1, are laminated in such a manner that the negative electrode terminal 6 and the positive electrode terminal 7, both being externally led out, are arrayed to extend in the same direction and that they are clamped together by means of an adhesive tape 22, thereby creating a combined battery 23. These single cells 21 are electrically connected with each other in series as shown in FIG. 4.

A printed wiring board 24 is disposed to face the side wall of each of the single cells 21 where the negative electrode terminal 6 and the positive electrode terminal 7 are externally led out. On this printed wiring board 24 are mounted a thermistor 25, a protection circuit 26, and a terminal 27 for electrically connecting the printed wiring board 24 with external instruments. It should be noted that in order to prevent unwanted electric connection with the wirings of the combined battery 23, an insulating plate (not shown) is attached to the surface of the printed wiring board 24 that faces the combined battery 23.

A lead 28 for the positive electrode is electrically connected, through one end thereof, with the positive electrode terminal 7 which is located at the lowest layer of the combined battery 23. The other end of the lead 28 is inserted into and electrically connected with a connector 29 for the positive terminal of the printed wiring board 24. A lead 30 for the negative electrode is electrically connected, through one end thereof, with the negative electrode terminal 6 which is located at the highest layer of the combined battery 23. The other end of the lead 30 is inserted into and electrically connected with a connector 31 for the negative terminal of the printed wiring board 24. These connectors 29 and 31 are electrically connected, through interconnects 32 and 33 formed on the printed wiring board 24, with the protection circuit 26.

The thermistor 25 is used for detecting the temperature of single cells 21 and the signals thus detected are transmitted to the protection circuit 26. This protection circuit 26 is designed to cut off, under prescribed conditions, the wiring 34a of plus-side and the wiring 34b of minus-side which are interposed between the protection circuit 26 and the terminal 27 for electrically connecting the printed wiring board 24 with external instruments. The expression of "under prescribed conditions" herein means the conditions where the temperature detected by the thermistor 25 becomes higher than a predetermined temperature for example. Further, the expression of "under prescribed conditions" herein also means the conditions where the over-charging, over-discharging and over-current of the single cells 21 are detected. The detection of this over-charging is performed against the single cells 21 individually or entirely. In the case where the single cells 21 are to be detected individually, either the voltage of cell may be detected or the potential of the positive electrode or negative electrode may be detected. In the latter case, a lithium electrode is inserted, as a reference electrode, into individual cells 21. In the case of the battery pack shown in FIGS. 3 and 4, a wiring 35 is connected with each of the single cells 21 for detecting the voltage thereof and the signals detected are transmitted, through this wiring 35, to the protection circuit 26.

On all of the sidewalls of the combined battery 23 excepting one sidewall where the negative electrode terminal 6 and the positive electrode terminal 7 are protruded, a protective sheet 36 made of rubber or synthetic resin is disposed, respectively.

The combined battery 23 is housed, together with each of protective sheet 36 and the printed wiring board 24, in a case 37. Namely, the protective sheet 36 is disposed on the opposite inner sidewalls constituting the longer sides of the case 37 and on one inner sidewall constituting one shorter side of the case 37. On the other sidewall constituting the other shorter side of the case 37 is disposed the printed wiring board 24. The combined battery 23 is positioned in a space which is surrounded by the protective sheet 36 and the printed wiring board 24. A cap 38 is attached to the top of the case 37.

By the way, a thermally shrinkable tube may be used in place of the adhesive tape 22 for fixing the combined battery 23. In this case, the protective sheet is disposed on the opposite sidewalls of combined battery 23 and then the thermally shrinkable tube is disposed to surround these protective sheets, after which the thermally shrinkable tube is allowed to thermally shrink, thereby fastening the combined battery 23.

Figure 3:
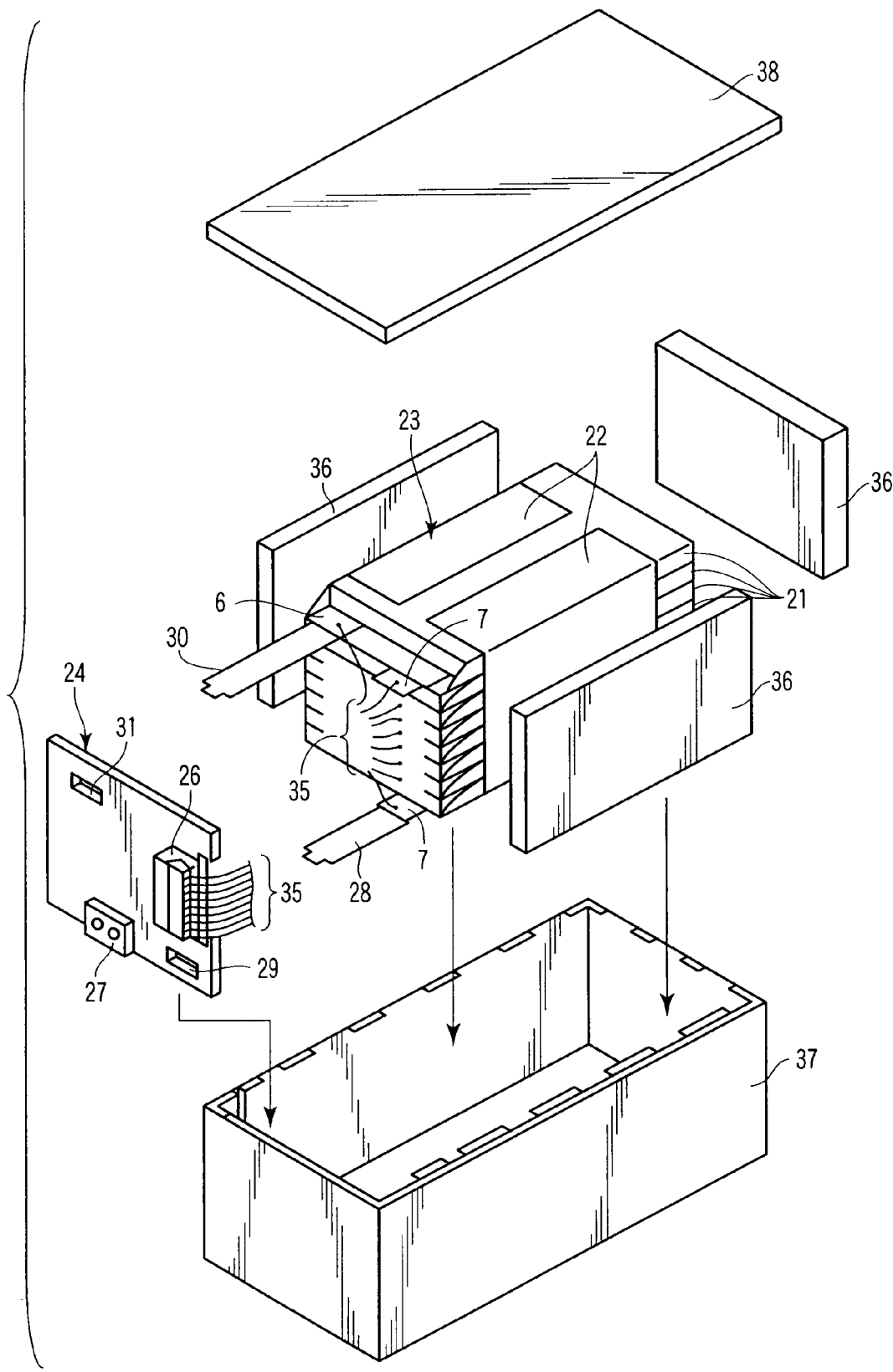
FIG. 3 is an exploded perspective view illustrating a battery pack according to an embodiment.
Figure 4:
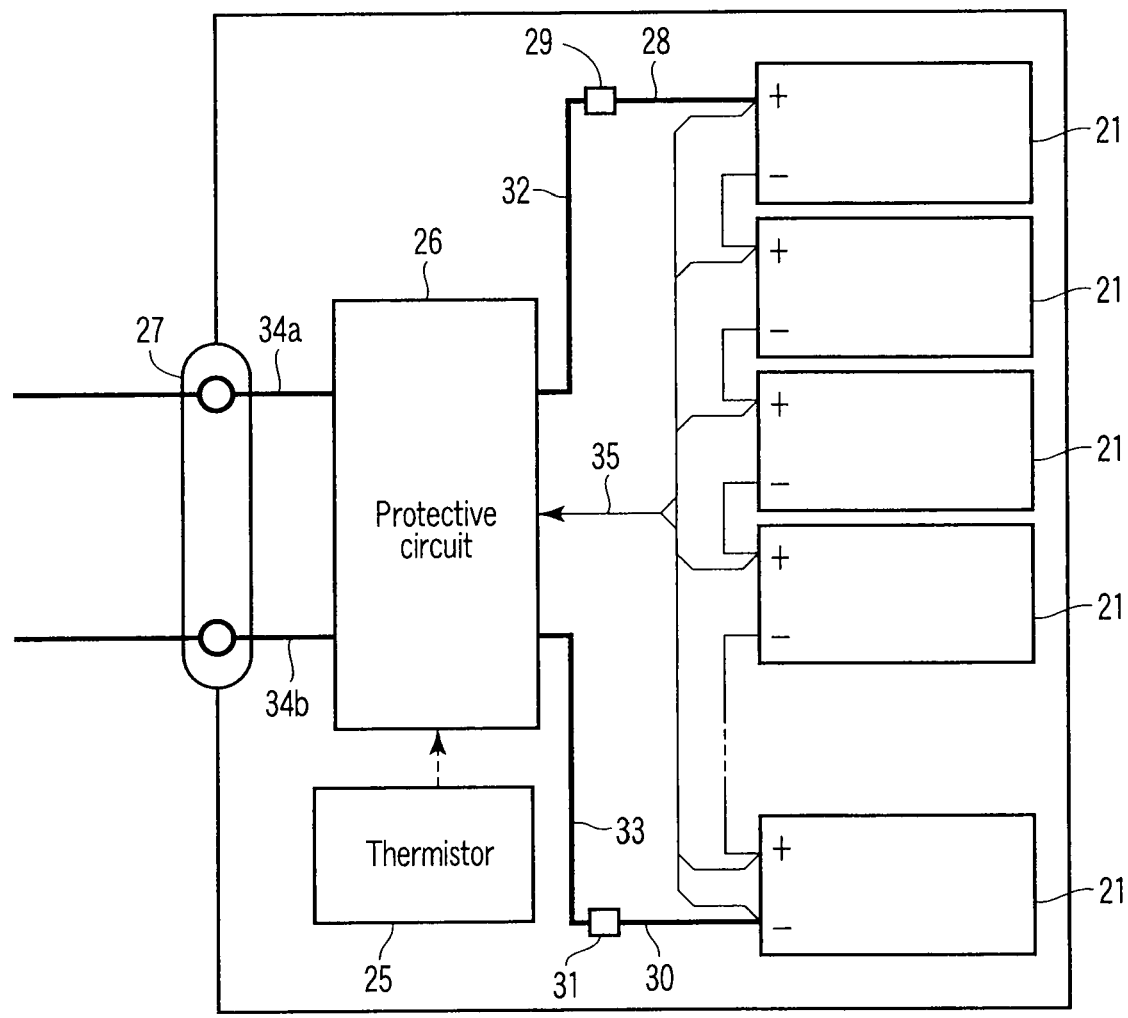
FIG. 4 is a block diagram illustrating the battery pack shown in FIG. 3.

In the embodiment shown in FIGS. 3 and 4, the single cells 21 are electrically connected to each other in series. However, a plurality of single cells may be electrically connected to each other in parallel in order to increase the capacity of a combined battery. Also, a plurality of battery packs, each assembled as described above, may be electrically connected to each other in series or in parallel.

Further, specific features of the battery pack may be optionally modified depending on the end-use thereof. As for the end-use of the battery pack, it can be preferably applied to those where excellent cycle characteristics are desired in large current performance. More specifically, the battery pack can be employed as a power source for digital cameras or as an on-vehicle type power source for two-wheeled or four-wheeled hybrid electric vehicles, for two-wheeled or four-wheeled electric vehicles, or for electric mopeds. Especially, the battery pack is most suited for use as an on-vehicle power source.

It should be noted that in the applications of battery where high-temperature characteristics are desirable as in the case of on-vehicle type battery pack, it is preferable to use a non-aqueous electrolyte containing a mixed solvent comprising a mixture of at least two kinds of materials selected from the group consisting of propylene carbonate (PC), ethylene carbonate (EC) and γ-butyrolactone (GBL), or a non-aqueous electrolyte containing γ-butyrolactone (GBL).

The present invention will be explained in more detail by way of examples. However, these examples are not intended to limit the present invention as long as they are within the scope of the present invention.

Example 1

<Production of a Positive Electrode>

First, 90% by weight of a lithium-manganese oxide ($LiMn_{1.9}Al_{0.1}O_4$) powder having a spinel type structure which was used as an active material, 5% by weight of acetylene black used as a conductive agent and 5% by weight of a polyvinylidene fluoride (PVdF) were added in N-methylpyrrolidone (NMP) and these components were mixed to prepare a slurry. This slurry was applied to both surfaces of a current collector made of an aluminum foil having 15 μm in thickness, followed by drying and pressing to manufacture a positive electrode having an electrode density of 2.9 g/cm$^3$.

<Production of Lithium-Titanium Composite Oxide Particles (1)>

First, $Li_2CO_3$ and anatase type $TiO_2$ were mixed such that the molar ratio of Li:Ti was 4:5 and the mixture was sintered at 850° C. for 12 hours in air to obtain a spinel type lithium-titanium composite oxide ($Li_4Ti_5O_{12}$) particles as a precursor.

The obtained lithium-titanium composite oxide particles, which were the precursor, had an average particle diameter of 0.86 μm. The method of measuring the average particle diameter will be explained below.

The particle diameter was identified using the following method. Using a laser diffraction type distribution measuring device (trade name: SALD-3000, manufactured by Shimadzu Corporation), first, a beaker was charged with about 0.1 g of a sample, a surfactant and 1 to 2 mL of distilled water and the mixture was thoroughly stirred. Then, the mixture was poured into a stirring water tank to measure the luminous distribution 64 times at intervals of 2 seconds to analyze the data of grain size distribution.

Then, 920 g of the synthesized $Li_4Ti_5O_{12}$ particles were poured into a solution prepared by dissolving 3.51 g of $Li_3PO_4$ in water, and the mixture was stirred and dried, followed by sintering at 400° C. for 3 hours to obtain a granular negative electrode active material.

The obtained negative electrode active material was subjected to sectional TOF-SIMS and sectional EDX. As a result, it was confirmed that a coating layer consisting of phosphorous and having 5 to 10 nm in thickness was formed on the entire surface of each of the lithium-titanium composite oxide particles. Also, the phosphorous was identified as $Li_3PO_4$ from the results of TOF-SIMS and XPS.

<Production of a Negative Electrode>

90% by weight of the obtained negative electrode active material (lithium-titanium composite oxide particles having phosphorous coating layer), 5% by weight of coke ($d_{002}$: 0.3465 nm, average particle diameter: 3 μm) calcined at 1200° C. as a conductive agent and 5% by weight of a polyvinylidene fluoride (PVdF) were added in N-methylpyrrolidone (NMP) and these components were mixed to prepare a slurry. This slurry was applied to both surfaces of a current collector made of an aluminum foil 15 μm in thickness and dried, followed by pressing to manufacture a negative electrode having an electrode density of 2.0 g/cm$^3$.

<Production of a Liquid Non-Aqueous Electrolyte>

1.5 mol/L of $LiBF_4$ used as an electrolyte was dissolved in a mixed solution prepared by blending ethylene carbonate (EC) and γ-butyrolactone (GBL) in a ratio by volume of 1:2 to prepare a liquid non-aqueous electrolyte.

<Production of an Electrode Group>

The positive electrode, a separator made of a porous polyethylene film having 25 μm in thickness, the negative electrode and a separator were sequentially laminated in this order to manufacture a flat electrode group. The obtained electrode group was housed in a pack made of an aluminum laminate film, which was then dried under vacuum at 80° C. for 24 hours. A liquid non-aqueous electrolyte prepared in advance was poured into the laminate film pack in which the electrode group was housed. After that, the pack was perfectly sealed by heat sealing to produce a non-aqueous electrolyte secondary battery which had the structure shown in FIG. 1 and had a width of 70 mm, a thickness of 6.5 mm and a height of 120 mm.

Example 2

First, $Li_2CO_3$ and anatase type $TiO_2$ were mixed such that the molar ratio of Li:Ti was 4:5 and the mixture was calcined at 850° C. for 12 hours in air to thereby obtain a spinel type lithium-titanium composite oxide ($Li_4Ti_5O_{12}$) particles as a precursor.

Then, 920 g of the synthesized $Li_4Ti_5O_{12}$ particles were poured into a solution prepared by dissolving 3.96 g of $(NH_4)_2SO_4$ in water, and the mixture was stirred and dried, followed by baking at 400° C. for 3 hours to obtain a granular negative electrode active material.

The obtained negative electrode active material was subjected to sectional TOF-SIMS and sectional EDX. As a result, it was confirmed that a coating layer consisting of sulfur and having 5 to 10 nm in thickness was formed on the entire surface of the lithium-titanium composite oxide particle. The sulfur was identified as $Li_2SO_4$ from the results of TOF-SIMS and XPS.

A non-aqueous electrolyte secondary battery was manufactured in the same manner as in Example 1 except that the obtained lithium-titanium composite oxide particles having sulfur coating layer were used as the negative electrode active material.

Example 3

A non-aqueous electrolyte secondary battery was manufactured in the same manner as in Example 1 except that the negative electrode active material was produced by forming a coating layer (a second coating layer) consisting of sulfur ($Li_2SO_4$) on the entire surface of a coating layer (a first coating layer), which was formed on the surface of each of the lithium-titanium composite oxide particles and consisted of phosphorous with the method of Example 1, in the same manner as in Example 2.

Comparative Example 1

A non-aqueous electrolyte secondary battery was manufactured in the same manner as in Example 1 except that the spinel type lithium-titanium composite oxide ($Li_4Ti_5O_{12}$) particles, which were synthesized in Example 1 and were not surface-modified, were used as the negative electrode active material.

Each battery obtained in Examples 1 to 3 and Comparative Example 1 was subjected to a high-temperature storage test conducted at 60° C. for 4 weeks in a 2.55 V-charged state to measure the thickness of the battery before and after it was stored. From these thicknesses of the battery, a change in the thickness of the battery was found according to the following equation.

Change in the thickness of the battery (times)=(Thickness after stored/Thickness before stored)

Further, with regard to each battery obtained in Examples 1 to 3 and Comparative Example 1, the DC resistance of the battery before the battery was stored was measured to calculate the ratio (times) of the resistance of the battery to the standard resistance which was that of the secondary battery of Comparative Example 1 using the negative electrode active material surface-coated with no material. These results are shown in Table 1 below. In this case, the DC resistance (R) was calculated from the difference in voltage between 10 C discharge and 1 C discharge. The battery was discharged under 10 C current ($C_1$) and 1 C current ($C_2$) for 0.2 second to measure the voltages $V_1$ and $V_2$ after discharged respectively and the DC resistance was calculated from the equation:

$R=(V_2-V_1)/(C_1-C_2)$.

TABLE 1

| | Material of coating layer formed on surface of spinel type lithium-titanium composite oxide particle | Change in thickness (times) | Battery resistance (time) |
|---|---|---|---|
| Comparative Example 1 | None | >2 | 1.00 |
| Example 1 | $Li_3PO_4$ | 1.07 | 0.95 |
| Example 2 | $Li_2SO_4$ | 1.10 | 1.25 |
| Example 3 | $Li_3PO_4/Li_2SO_4$ | 1.04 | 0.90 |

As is clear from Table 1, it is found that the secondary battery of Comparative Example 1 using the negative electrode active material, which consists of the lithium-titanium composite oxide not having a coating layer, is swelled and increased in change in the thickness of the battery when the battery is stored at high temperatures.

It is understood that each secondary battery obtained in Examples 1 to 3 using the negative electrode active material, which comprises the lithium-titanium composite oxide particles and a coating layer formed on the surface of each of the particles and consisting of phosphorous, sulfur or phosphorous and sulfur, on the other hand, can be reduced in the swelling of the battery when it is stored at high temperatures.

In the batteries of Examples 1 to 3, the battery of Example 2 using the negative electrode active material, which comprises the lithium-titanium composite oxide particles and a coating layer formed on the surface of each of the particles and consisting of sulfur, is more increased in the resistance of the battery than the battery of Comparative Example 1.

On the other hand, the battery of Example 1 using the negative electrode active material, which comprises the lithium-titanium composite oxide particles and a coating layer formed on the surface of each of the particles and consisting of phosphorous, is suppressed in increase in battery resistance and is more reduced in the swelling of the battery when it is stored at high temperatures than the battery obtained in Example 2. The battery of Example 3 using the negative electrode active material, which comprises the lithium-titanium composite oxide particles and the first coating layer formed on the surface of each of the particle and consisting of phosphorous, and the second coating layer formed on the surface of the first coating layer and consisting of sulfur, is more suppressed in increase in battery resistance and is even more reduced in the swelling of the battery when it is stored at high temperatures than the battery obtained in Example 1.

Comparative Example 2, Examples 4 to 6

Non-aqueous electrolyte secondary batteries were manufactured in the same manner as in Examples 1 to 3 and Comparative Example 1 except that a ramsdellite type lithium-titanium composite oxide particle (average particle diameter: 0.82 μm) represented by the formula: $Li_2Ti_3O_7$ was used as the precursor of the negative electrode active material. With regard to the obtained batteries, a change in the thickness of the battery before and after the battery being stored and the resistance of the battery before the battery being stored, were likewise measured. The results are shown in Table 2 below.

TABLE 2

| | Material of coating layer formed on surface of ramsdellite type lithium-titanium composite oxide particle | Change in thickness (times) | Battery resistance (time) |
|---|---|---|---|
| Comparative Example 2 | None | >2 | 1.00 |
| Example 4 | $Li_3PO_4$ | 1.10 | 0.96 |
| Example 5 | $Li_2SO_4$ | 1.12 | 1.23 |
| Example 6 | $Li_3PO_4/Li_2SO_4$ | 1.08 | 0.95 |

As is clear from the above Table 2, it is understood that the batteries of Examples 4 to 6 using a ramsdellite type lithium-titanium composite oxide particle as the negative electrode active material accomplish the same effect as the batteries of Examples 1 to 3 using a spinel type lithium-titanium composite oxide particle as the negative electrode active material.

Embodiments of the present invention being thus described, it will be obvious that the present invention is not limited to the above embodiments and various modifications are therefore possible without departing from the spirit and scope of the present invention defined by the appended claims. Also, the present invention may be varied without departing from the spirit of the invention when it is embodied. Further, various inventions may be formed by appropriately combining plural structural elements disclosed in the above embodiments.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

What is claimed is:

1. An active battery material, comprising a lithium-titanium composite oxide particle and a coating layer formed on at least a part of the surface of the particle, the coating layer comprising at least one element selected from the group consisting of $TiP_x$ ($0<x\leq2$), $Li_yTiPO_4$ ($0\leq y\leq2$) and $Li_zTiS_2$ ($0<z\leq2$).

2. The active material according to claim 1, wherein the coating layer has a multi-layers structure, a first coating layer is formed on the surface of the lithium-titanium composite oxide particle and consists of $TiP_x$ ($0<x\leq2$) or $Li_yTiPO_4$ ($0 \leq y \leq 2$), and a second coating layer is formed on at least a part of the surface of the first coating layer and consists of $Li_zTiS_2$ ($0 < z \leq 2$).

3. The active material according to claim 2, wherein the area of the first coating layer to be formed is 50% or more of the surface of the lithium-titanium composite oxide particle.

4. The active material according to claim 1, wherein the coating layer has a thickness of 1 to 100 nm.

5. The active material according to claim 1, wherein the lithium-titanium composite oxide particle is a particle of lithium-titanium composite oxide having a spinel type structure or a ramsdellite type structure.

6. A non-aqueous electrolyte battery comprising:
a container;
a positive electrode housed in the container;
a negative electrode housed in the container with a space from the positive electrode and containing an active material; and
a non-aqueous electrolyte housed in the container,
wherein the active material comprises a lithium-titanium composite oxide particle and a coating layer formed on at least a part of the surface of the particle, the coating layer comprising at least one element selected from the group consisting of $TiP_x$ ($0 < x \leq 2$), $Li_yTiPO_4$ ($0 \leq y \leq 2$) and $Li_zTiS_2$ ($0 < z \leq 2$).

7. The battery according to claim 6, wherein the coating layer has a multi-layers structure, a first coating layer is formed on the surface of the lithium-titanium composite oxide particle and consists of $TiP_x$ ($0 < x \leq 2$) or $Li_yTiPO_4$ ($0 \leq y \leq 2$), and a second coating layer is formed on at least a part of the surface of the first coating layer and consists of $Li_zTiS_2$ ($0 < z \leq 2$).

8. The battery according to claim 7, wherein the area of the first coating layer to be formed is 50% or more of the surface of the lithium-titanium composite oxide particle.

9. The battery according to claim 6, wherein the coating layer has a thickness of 1 to 100 nm.

10. The battery according to claim 6, wherein the lithium-titanium composite oxide particle is a particle of lithium-titanium composite oxide having a spinel type structure or a ramsdellite type structure.

11. The battery according to claim 6, wherein the positive electrode contains a manganese-containing lithium transition metal composite oxide as an active material.

12. The battery according to claim 11, wherein the manganese-containing lithium transition metal composite oxide has a spinel type structure.

13. The battery according to claim 6, wherein the non-aqueous electrolyte contains one solvent or two or more mixing solvent selected from the group consisting of propylene carbonate, ethylene carbonate and γ-butyrolactone.

14. A battery pack comprising a plurality of the non-aqueous electrolyte batteries as claimed in claim 6, which are connected each other in series, in parallel, or in series and parallel.

15. The battery pack according to claim 14, further comprising a protective circuit which can detect a voltage of non-aqueous electrolyte battery.

* * * * *